Figure 1:
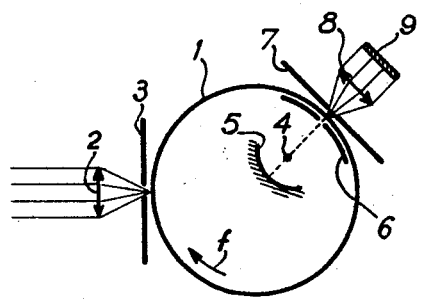

Feb. 5, 1963  G. VERNOIS  3,076,967
DELAY OR MEMORY DEVICE AND A MULTI-CURVE
GRAPH RECORDER EMBODYING SAME
Filed June 7, 1960

United States Patent Office 3,076,967
Patented Feb. 5, 1963

3,076,967
DELAY OR MEMORY DEVICE AND A MULTI-CURVE GRAPH RECORDER EMBODYING SAME
Goulven Vernois, 17 Rue de Fontenay, Chatillon Sous Bagneux, France
Filed June 7, 1960, Ser. No. 34,454
4 Claims. (Cl. 346—49)

This invention relates to delay or memory devices comprising a phosphorescent surface capable of storing information in the form of phosphorescent images, or latent optical images, and delivering said information at a later time. Such devices may therefore be described as storage, memory or delay devices.

Certain chemical substances so-called phosphorographic substances are known to be capable, when illuminated, to retain a record of the illuminated area for some time after the illumination has been discontinued. The record thus retained or stored in the material is generally in the form of a phosphorescent image or signal or a latent image, that is, it is normally invisible, but can be made visible again by excitation of the previously illuminated area with suitable exciting radiation, generally infrared radiation.

Information-storage and similar systems utilizing the phosphorescent effect have already been employed in computer apparatus, as well as in the signalling arts. In such prior systems, the phosphorescent substance has generally been coated on a substrate such as a longitudinally moving tape, or a revolving disc. A so-called primary light signal was impressed on a point of the coated surface at one point along the path of travel of the tape or disc, and the corresponding secondary light signal was retrieved by suitable pickup means from the same point of the coated surface at another point along the path of travel of the tape or disc, beyond the first point.

It is an object of this invention to provide an information-storage, memory, or delay device using the phosphorographic effect, as just defined, which will possess a number of practical advantages over similar devices as heretofore used. Objects are to provide such devices which will be more compact, for a given information storage capacity, and susceptible of highly accurate control of the delay time embodied in them. Another object is to provide such a device which will be capable of accepting primary signals variable in position along a coordinate other than the coordinate of displacement of the medium.

A further important object of the invention is to utilize such an improved delay device in order to compensate for the inevitable optical displacement or shifting present between each of a plurality of recording elements, such as styluses, in a multi-curve graph recorder. A consequent object is to provide an improved multi-curve graph recorder which will be inherently capable of recording congruent curves representing a plurality of concurrently-progressing phenomena, in which the points of the respective curves having the same time coordinate along the direction of motion of the record medium, will all represent the states or values of said respective phenomena at a common instant of time.

In accordance with a main aspect of the invention, there is provided a delay device comprising a tubular cylindrical element, a layer of phosphorographic substance coating a peripheral surface of said element over a substantial axial length thereof, means mounting the element for rotation about its axis at a controllable rate, means positioned for directing a light ray against said coating along a generatrix of the tubular cylindrical element while said element is at one angular position, and pickup means positioned to pickup a corresponding but delayed light ray from said coating along said generatrix while the element is at another angular position.

Preferably the tubular cylindrical element is formed from a material transparent to the exciting radiation used. In that case a source of exciting radiation if used, e.g. a filament emitting infrared rays and extending parallel to the axis of the element, is desirably mounted within the tubular recess of the element, together with the requisite beam-concentrating means for said rays.

Figure 2:
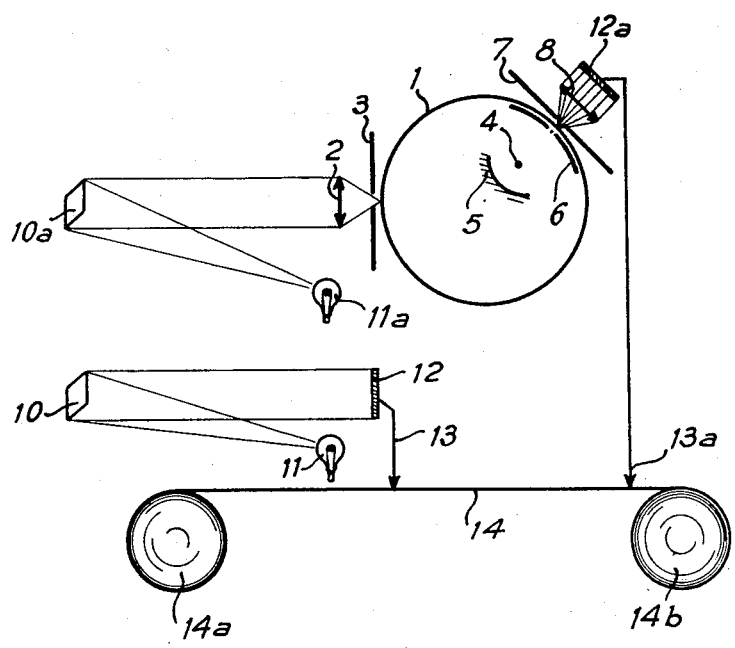

The above and further objects, features and advantages of the invention will appear from the ensuing description made with reference to the accompanying drawings, given by way of illustration but not of limitation, and wherein:

FIGURE 1 is a highly schematic view of a delay device according to the invention, in cross section transversely to the axis of the tubular element thereof; and FIGURE 2 is a schematic view of a multi-curve graph recorder embodying a delay device of the type shown in FIGURE 1.

Referring first to FIGURE 1 a delay or memory device according to the invention comprises a thin-walled tubular element 1, made of a suitable material transparent to infrared radiation, and mounted through any suitable means, not shown, for rotation about its axis. Further means, not illustrated, are provided for imparting to the tubular element a controlled rotation at an adjustable rate in the direction shown by arrow $f$. The outer wall surface of the tubular element 1 is coated with a suitable phosphorographic composition.

A pencil of light from an optical source, not shown in FIGURE 1, but an example of which will be indicated later, is arranged to pass through a focusing optic or lens 2, and is then passed through an adjustable slot formed in a screen 3 onto the surface of the element 1 as indicated. Mounted within the tubular element 1 in a direction parallel to its axis is a filament source 4 of infrared rays, and means, herein a concave mirror 5, are provided for focusing the infrared beam emitted from filament 4, through a slotted screen 6 of arcuate form provided within element 1 near its wall surface, and through said wall surface onto the phosphorographic coating thereon. Preferably an additional and adjustable slotted screen 7 is provided outside the element 1 in register with the slotted member 6. An output optical system or lens 8 is provided to pick up the light image that forms on the coating as will be presently explained and project it as a beam upon a receiver element 9, such as a spot follower photoelectric cell.

In operation, it will be understood that as the tube 1 rotates clockwise, a light signal impinging on the phosphorographic layer beyond the slotted screen 3 forms in said layer a latent image. As the tube 1 rotates clockwise, the thus sensitized area is brought to a position registering with the slot in member 6, at which time the latent image is excited by the infrared rays striking it from the source 4, so that said area emits a beam of visible light which strikes the receiver element 9. It will be apparent that by adjusting the rate of rotation of the tubular element 1, any desired time lag may be obtained as from the occurrence of the primary light signal striking the tube to the occurrence of the corresponding secondary light signal striking the receiver element or photo-cell 9. Moreover, should the primary light signal applied through the slot 3 be a point signal displaced along the length of the tube, i.e. parallel with the axis of the tube, e.g. in accordance with the variations in some physical magnitude, then the successive positions assumed by said signal will be imprinted on the phosphorographic layer of the tube as a continuous or broken curve and reproduced, with a predetermined time lag, by the positions of the secondary signal applied to the receiver 9.

FIGURE 2 illustrates a multi-curve graph recording apparatus embodying the delay device just described. The apparatus shown in FIGURE 2 includes a record tape 14 which is fed at a constant rate through conventional means from a reel 14a to a reel 14b i.e. rightward in the drawing. A first stylus 13 is displaceable transversely of the tape in accordance with the angular displacements of a galvanometer mirror schematically indicated at 10, which serves to reflect the light beam from a source 10 on to a photo-cell 12 associated with the stylus 13. It will be understood that suitable mechanism, not shown, is provided for displacing the stylus 13 perpendicularly to the plane of the drawing in accordance with the amount of illumination striking cell 12, so as to cause the stylus 13 to follow with a high degree of accuracy the angular displacements of the galvanometer device 10. Photoelectrical recording apparatus of the general type contemplated herein are well-known and are not believed to require further description. Thus the stylus 13 may record the variations of a selected parameter of some physical condition being investigated, as a curve along the tape 14.

A further stylus 13a displaced lengthwise from stylus 13 along the tape in the direction of tape advance is provided for recording another parameter of the condition or effect being investigated. The stylus 13a is controlled in its displacements across the tape from a further galvanometer mirror 10a, responsive to the last-mentioned parameter, with the transmission link from the mirror 10a to the stylus 13a including a delay device similar to the one described with reference to FIGURE 1. Specifically, a light beam from a source 11a is reflected by the displaceable mirror 10a through the optical system 2 upon the slotted screen 3 provided adjacent one point of the path of rotation of the wall of tubular element 1. As previously explained, the latent image formed on the phosphorographic surface of the element 1 is excited by the infrared rays from filament 4 as the image area attains a point registering with slotted members 6—7. The resulting light beam, which corresponds in position (along the axial dimension of the tube 1) with the position of the primary image applied through slot 3, is received on the photo-cell 12a which is associated with the stylus in the same way as photo-cell 12 is associated with stylus 13, e.g. through photoelectric servo-mechanism as mentioned above. Hence the stylus 13a will be positioned across the tape 14 correspondingly to the displacements of the galvanometer mirror 10a.

It will be evident that, provided the rate of rotation of the tubular memory element 1 is adjusted at such a value that the time taken by the element to rotate over the arcuate distance from the primary image at 3 to the secondary image at 7 equals the time taken by the tape to advance from a point adjacent stylus 13 to a point adjacent the stylus 13a, then the transverse coordinates (across the tape 14) of the point recorded by stylus 13a represent the value assumed by the second investigated parameter at a time later than the time at which the first parameter has assumed the value being recorded by stylus 13, by the interval required by the tape to move from stylus 13 to stylus 13a. In other words, the two curves recorded on the tape by the styli 13 and 13a will be congruent, in that any two points of the respective curves having a common longitudinal coordinate will represent the values assumed by the respective parameters at the same instant in time.

It is clear that in case more than two parameters are to be concurrently investigated or monitored, there would be provided more than one delay device according to the invention arranged in the transmission links operating all of the various styluses used other than the first, directly-driven stylus 13.

Various modifications may be made in the single embodiment of the improved memory or delay device illustrated herein. Thus certain phosphorographic compositions are such that they do not require excitation with infra-red (or other) radiation to excite the latent image recorded therein by the primary light signal. Otherwise stated, the image in such case is not a latent image, but remains constantly visible. In such cases, it will be evident that the filament 4 or other source of exciting radiations and related components can be dispensed with. Further, the source of exciting radiations and related components may, if found more convenient, be disposed outside rather than inside the tubular element. Said source may be mounted on a common support with the spot-follower photo-cell 12a. A device, for example, a suitable irradiating tube (not shown), may also be provided for erasing the image stored by the phosphorographic substance after the image passes the receiver element 9.

It will also be understood that the adjustable delay or memory device of the invention is susceptible of a wide variety of applications other than the specific one described and that its use is not restricted to the field of physical recording instruments.

What I claim is:

1. A multicurve graphic recorder comprising means for feeding an elongated record medium in a longitudinal direction, at least two mechanical recording elements each mounted for displacement across the entire width of said medium to record respective curves thereon, said recording elements being displaced relative to each other in the longitudinal direction of said medium, a first photoelectrically operated mechanism responsive to variations in the position of a mobile luminous signal as a function of a first variable magnitude to be recorded for imparting to one of said recorder elements corresponding displacements across said medium, at least another photoelectrically operated mechanism responsive to the variations in the position of a mobile luminous signal as a function of a second variable magnitude to be recorded concurrently with said first magnitude, for imparting to another of said recording elements corresponding displacements across said medium, and a phosphorographic delay device interposed between the mobile luminous signal which is a function of said second variable magnitude and said other photoelectrically operated mechanism, said delay device introducing a delay that is substantially equal to the time required for the medium to progress from the position of said first recording element to the position of said other recording element so that, at any point along the medium, the lateral positions of the curves recorded thereon by said recording elements will represent the respective variable magnitudes at the same point in time.

2. A multicurve graphic recorder comprising means for advancing an elongated record medium is the direction of the longitudinal axis of said medium, at least first and second recording elements disposed at spaced apart locations along the record medium and each movable across substantially the entire width of said medium to record curves on the latter which are characteristic of the variations with time of the magnitudes of first and second functions, respectively, a first photoelectrically operated mechanism responsive to variations in the position of a first mobile luminous signal with changes in the magnitude of said first function to correspondingly displace said first recording element across the record medium, a moving substrate having phosphorographic substance thereon, image recording means continuously recording on said substance on image of a second mobile luminuos signal which is moved transversely with respect to the direction of movement of said substrate in accordance with changes in the magnitude of said second function, and a second photoelectrically operated mechanism responsive to variations in the transverse position of said image at a location spaced from said image recording means in the direction of movement of said substrate to correspondingly displace said second recording element across said medium, the speed of movement of said substrate being predetermined in relation to the speed of movement of the record medium so that, at any point along the latter, the lateral positions of the recorded curves thereon represent the simultaneously occurring magnitudes of said first and second functions.

3. A multicurve graphic recorder as in claim 2; wherein said substrate is in the form of a cylindrical body rotated about its axis and having said phosphorographic substance on the surface thereof, said image recording means includes optical means directing said image of the second mobile signal against said surface at a first angular position and moving said image parallel to said axis of the rotated body; and wherein a screen having a slot extending parallel to said axis of the rotated body is disposed adjacent said surface of the latter at a position spaced angularly from said first angular position in the direction of rotation of said body, and optical means is interposed between said screen and said second photoelectrically operated mechanism for directing against the latter said image exposed at said slot.

4. A multicurve graphic recorder as in claim 3; wherein said image recording means is operative to produce a latent image of said second mobile luminous signal on said phosphorographic substance; and further comprising means irradiating said phosphorographic substance at the position of said slot so as to restore the luminosity of said latent image.

References Cited in the file of this patent

UNITED STATES PATENTS

| | | |
|---|---|---|
| 2,203,352 | Goldmark | June 4, 1940 |
| 2,276,423 | Silverman | Mar. 17, 1942 |
| 2,436,503 | Cleveland | Feb. 24, 1948 |
| 2,724,631 | Ruhland | Nov. 22, 1955 |
| 2,742,631 | Rajchman et al. | Apr. 17, 1956 |

FOREIGN PATENTS

| | | |
|---|---|---|
| 1,166,356 | France | June 16, 1958 |